United States Patent [19]

Steinmetz et al.

[11] Patent Number: 4,927,183
[45] Date of Patent: May 22, 1990

[54] ADAPTING PIECE OF THERMOPLASTIC MATERIAL

[75] Inventors: Hans-Werner Steinmetz, Schaffhausen; Fritz Reich, Uhwiesen, both of Switzerland

[73] Assignee: Georg Fischer Aktiengesellschaft, Schaffhausen, Switzerland

[21] Appl. No.: 317,075

[22] Filed: Feb. 28, 1989

Related U.S. Application Data

[63] Continuation-in-part of Ser. No. 58,990, Jun. 8, 1987, abandoned.

[30] Foreign Application Priority Data

Jun. 25, 1986 [CH] Switzerland ............ 02562/86

[51] Int. Cl.[5] .......................... F16L 21/08
[52] U.S. Cl. ......................... 285/21; 285/243; 285/369; 285/423
[58] Field of Search ........... 285/21, 423, 156, 243; 219/544; 156/273.9, 274.2, 379.7

[56] References Cited

U.S. PATENT DOCUMENTS

| 3,788,928 | 1/1974 | Wise | 285/21 |
|---|---|---|---|
| 3,907,625 | 9/1975 | Vogelsanger | 285/919 |
| 4,096,017 | 6/1978 | Wyke et al. | 156/273.9 |
| 4,274,662 | 6/1981 | de Groot et al. | 285/21 |
| 4,362,684 | 12/1982 | Thalmann | 285/21 |
| 4,508,368 | 4/1985 | Blumenkranz | 285/21 |
| 4,536,644 | 8/1985 | Thalmann | 285/21 |
| 4,602,148 | 7/1986 | Ramsey | 285/21 |

FOREIGN PATENT DOCUMENTS

| 209804 | 11/1955 | Australia | 285/21 |
|---|---|---|---|
| 217080 | 11/1956 | Australia | 156/274.2 |
| 3411179 | 1/1986 | Fed. Rep. of Germany | 285/21 |
| 1208967 | 2/1960 | France . | |
| 211042 | 9/1960 | Netherlands | 285/21 |
| 400687 | 4/1966 | Switzerland | 285/21 |

Primary Examiner—Dave W. Arola
Attorney, Agent, or Firm—Toren, McGeady & Associates

[57] ABSTRACT

An adapting piece of thermoplastic material includes at least one welding sleeve portion with an electrical heating device formed by two heating mats arranged next to each other in circumferential direction. The welding sleeve portion has at least one radial incision extending in axial direction. By means of a clamping nut, the welding sleeve portion can be braced together with the heating elements against a tubular piece inserted in the welding sleeve portion. As a result, the pieces are fixed and supported before and during welding.

6 Claims, 4 Drawing Sheets

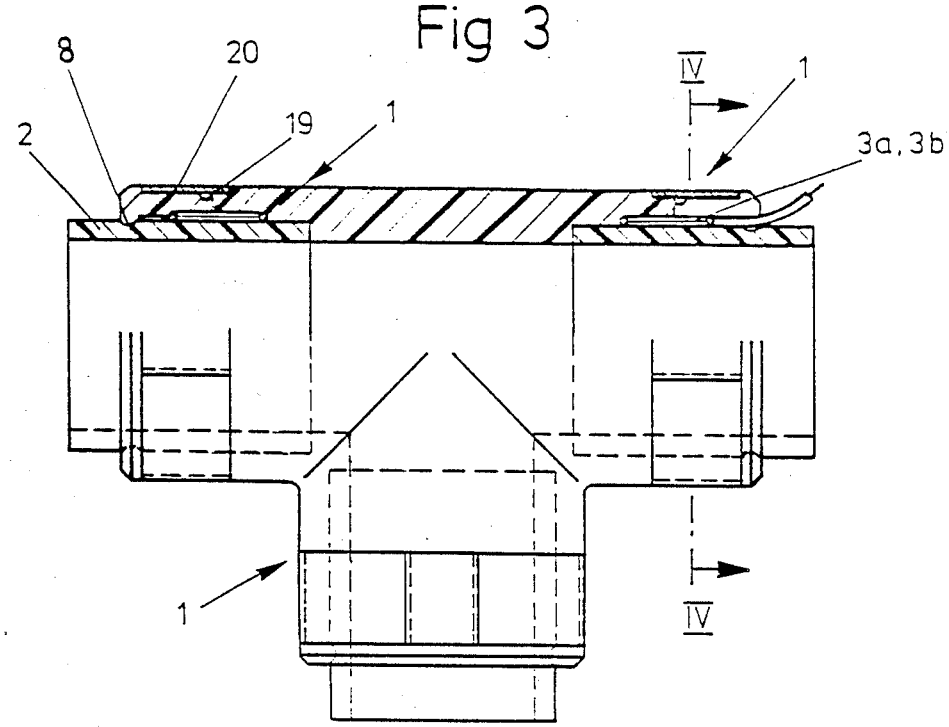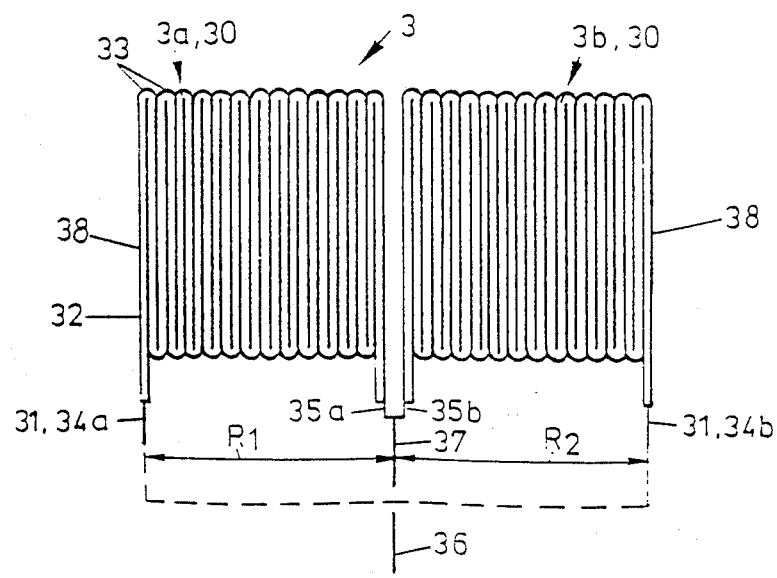

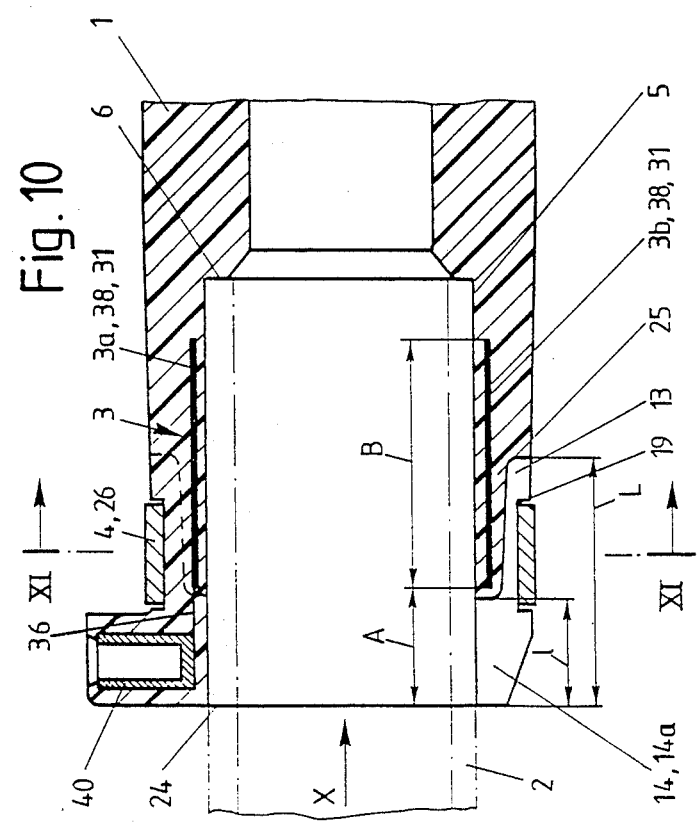
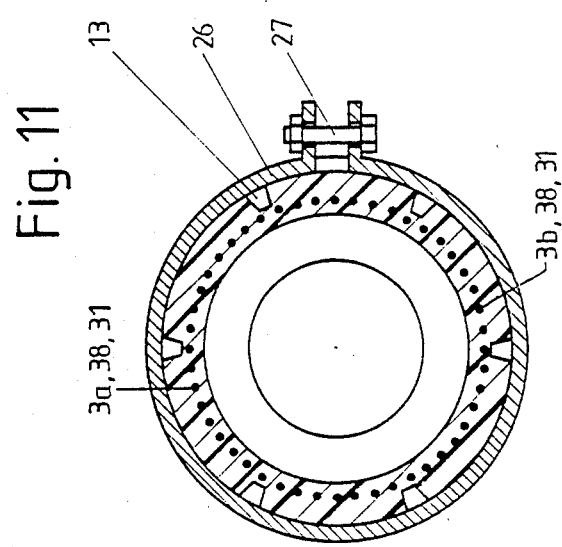
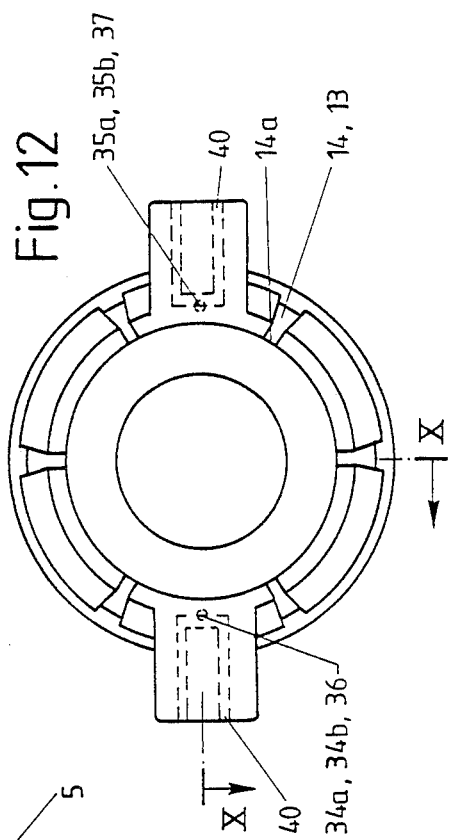

ADAPTING PIECE OF THERMOPLASTIC MATERIAL

This is a continuation-in-part of application Ser. No. 058,990, filed June 8, 1987, and now abandoned.

BACKGROUND OF THE INVENTION

1. Field of the Invention

The present invention relates to an adapting piece of thermoplastic material. The adapting piece includes at least one welding sleeve portion with an electrical heating device. The welding sleeve portion serves to connect the adapting piece to a tubular piece.

2. Description of the Prior Art

An adapting piece of the above-described type of thermoplastic material in the form of a T piece is known from AT-B-203 202. This T piece is provided with welding sleeve portions with electrical heating devices for connecting the adapting piece to pipes. The adapting piece is an injection molded piece in which annular heating elements are embedded, so that the manufacture of the adapting piece by injection molding is very complicated and expensive. Due to diameter tolerances which may exist in the pipes and in the sleeve portions of the adapting piece, it is possible that the welding connections between the pipes and the sleeve portions are insufficient or untight because a welding pressure cannot be built up. In addition, due to the play existing between the pipes and the welding sleeves, it is necessary to provide devices for supporting the pipes and adapting piece during the welding process. Such devices require a substantial amount of space. This space is not available in the case of sanitary installations where the pipes must be placed in narrow wall recesses.

EP-B1-0036 963 discloses a welding sleeve in which the welding pressure required for a tight and secure welding connection is obtained by releasing a frozen-in shrinkage stress during welding. However, in this welding sleeve, devices are required for fixing the sleeve during the welding process. If the welding sleeve is used for supply lines which are installed outdoors, this requirement of a fixing device is not a considerable disadvantage.

It is, therefore, the primary object of the present invention to provide an adapting piece of the above-mentioned type which can be installed by fixing it before and during the welding process without additional devices within very narrow space relative to the pipes or tubular pieces to which it is to be connected. In addition, a tight and secure welding connection is to be ensured, so that the adapting piece can be used in pressure pipe systems, such as, cold water and warm water pipes in sanitary installations.

SUMMARY OF THE INVENTION

In accordance with the present invention, the welding sleeve portion of the adapting piece defines over a portion of its length at least one radial incision or groove which extends in axial direction. At least one clamping element provided on the outer circumference of the welding sleeve portion serves to radially compress and fix this portion. The heating device is formed by at least one radially deformable heating element.

By providing at least one clamping element on the welding sleeve portion of the adapting piece, the tubular pieces inserted into and aligned with the sleeve portion can be fixed and held in position before and during the welding process. By providing at least one radial incision or groove extending in axial direction, the welding sleeve portion is slightly radially deformable over at least a portion of its length, so that, since the at least one heating element is also radially deformable, it is possible with simple clamping means and requiring small forces to securely clamp the tubular pieces within the welding sleeve portions. Thus, it is possible to carry out the welding process without the requirement of additional support devices for the aligned support of the tubular pieces and the adapting piece. Moreover, the initial tension imparted on the welding sleeve portion results in a welding pressure which ensures a perfectly tight welding connection.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 3 shows, partly in section, another embodiment of the adapting piece according to the present invention;

FIG. 5 is a view of the heating device in the flat state;

FIG. 10 is a sectional view of a sleeve portion of an adapting piece taken along sectional line X—X of FIG. 12;

FIG. 11 is a cross-sectional view taken along sectional line XI—XI of FIG. 10; and FIG. 12 is a view in the direction of arrow X of FIG. 10.

DETAILED DESCRIPTION OF THE INVENTION

Figure 1:
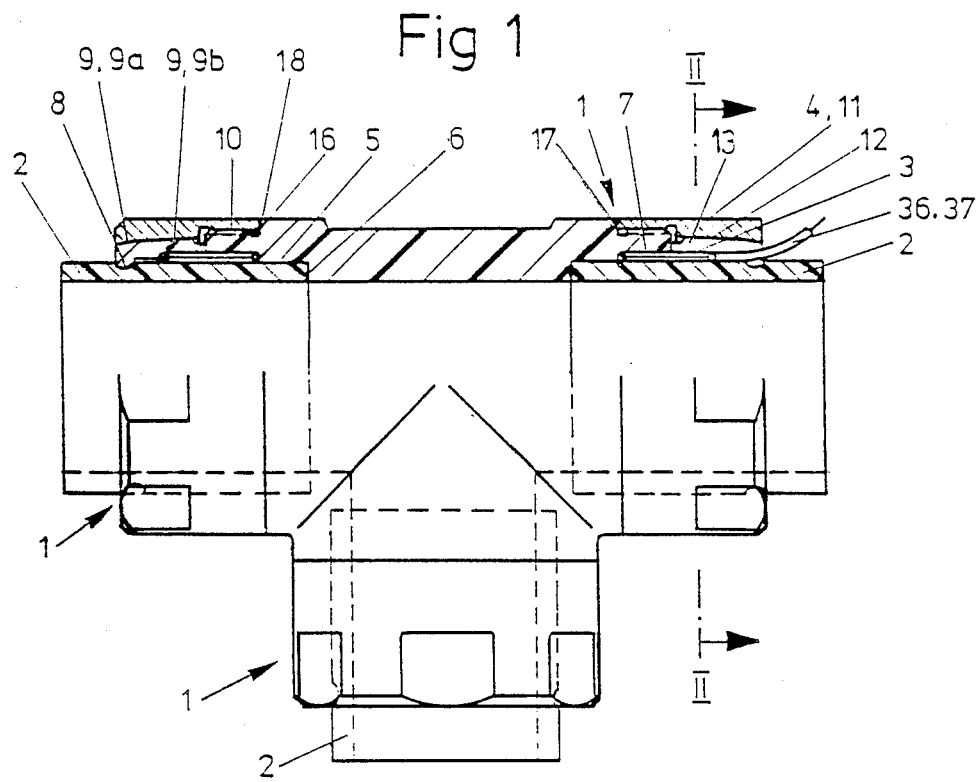
FIG. 1 shows, partly in section, an embodiment according to the invention in the form of a T piece.
Figure 2:
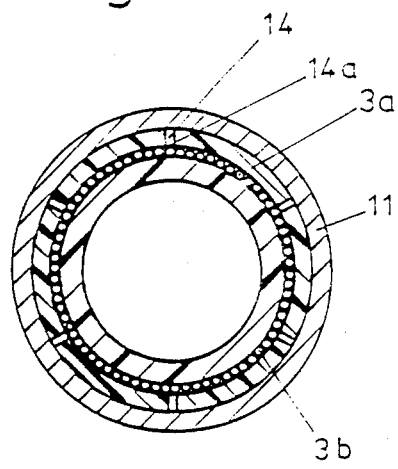
FIG. 2 is a sectional view taken along sectional line II—II of FIG. 1.

As illustrated in FIGS. 1 and 2 of the drawing, the adapting piece according to the invention is a T piece of a thermoplastic and weldable material which has three welding sleeve portions 1 for connection with tubular pieces 2. The welding sleeve portions 1 are each provided with an electrical heating device 3 and at least one clamping element 4. The inner surface of each sleeve portion 1 has a centering seat 5 with a stop surface 6 for the tubular piece 2 to be inserted. The sleeve portion 1 further defines an annular recess 7 for receiving the heating device 3. At its outer end, the sleeve portion 1 has a shoulder 8 for fixing and supporting the tubular piece 2. The outer surface of sleeve portion 1 defines a tapered portion 9. Preferably, tapered portion 9 includes a first portion 9a which is inclined at a steep angle and a second portion 9b which is inclined at an angle less steep than the first portion. Portion 9b is followed by an external thread 10 and an end face 16. A clamping nut 11 can be screwed onto external thread 10.

Clamping nut 11 has an internal taper 12 which has taper portions which correspond to portions 9a and 9b of tapered portion 9.

Clamping nut 11 has at its end face 17 a corrugation 18 which, when the nut 11 is tightened, engages in a corresponding corrugation formed in the end face 16 of welding sleeve portion 1, so that nut 11 is secured against rotation Clamping nut 11 may be made of metal or plastics material, or it may be made of a plastics material and an outer metal ring.

Tapered portion 9 has radial incisions 13 which extend in axial direction and are distributed over the circumference of the portion 1. As a result, sleeve portion 1 is slightly radially deformable.

Heating device 3 includes two heating elements 3a, 3b which are arranged next to each other in circumferential direction. The heating conductors 38 of heating elements 3a, 3b are connected in parallel.

FIG. 5 shows the heating device 3 consisting of two heating elements 3a, 3b which, as illustrated in FIG. 2, are placed in recess 7 opposite each other in circumferential direction. Each heating element 3a, 3b is constructed in the form of a heating mat 30 obtained by a zig-zag arrangement extending in axial direction of a resistance wire 31. Resistance wire 31 is coated with a thermoplastic material, so that the resulting insulation 32 electrically insulates the windings 33 located adjacent each other. Ends 34a and 34b of the respective resistance wire 31 are connected to a current connector 36 and ends 35a and 35b are connected to a connector 37, so that the two resistances R1 and R2 of the heating elements 3a, 3b are connected in parallel, the ohmic individual resistances of the heating elements 3a, 3b being equal or essentially equal. The above-described arrangement of the heating elements makes it possible that the current connectors 36, 37 can emerge at one side of the sleeve, without requiring a bifilar winding.

The heat conductor 38 shown in FIG. 5 is arranged in axial direction in the form of windings which are not located tightly next to each other. Thus, each heating element 3a, 3b is radially deformable when placed in recess 7, so that a radial deformation of the entire welding sleeve portion 1 by means of clamping element 4 is facilitated.

Figure 4:
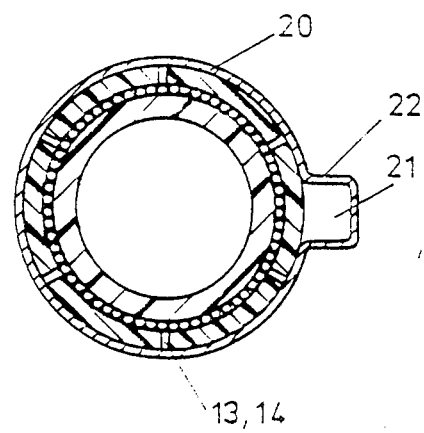
FIG. 4 is a sectional view taken along sectional line IV—IV of FIG. 3.

In the embodiment of the present invention illustrated in FIGS. 3 and 4, clamping element 4 is a clamping ring 20 which is placed in a recessed portion 19 of the cylindrically-shaped outer surface of the welding sleeve portion 1. It is also possible to have two or more clamping rings 20 arranged next to each other.

As illustrated in FIG. 4, clamping ring 20 has at a portion of its circumference a bulge 21 with two sides 22 which can be engaged by pliers. When the two sides 22 are pressed toward each other by means of pliers, the clamping ring 20 is tightened and, thus, the deformable welding sleeve portion 1 is braced radially against the tubular piece 2 inserted in the sleeve portion 1. Other types of clamping members are also possible, such as, clips which can be clamped together by means of screws, or hose-type clamping members.

Figure 6:
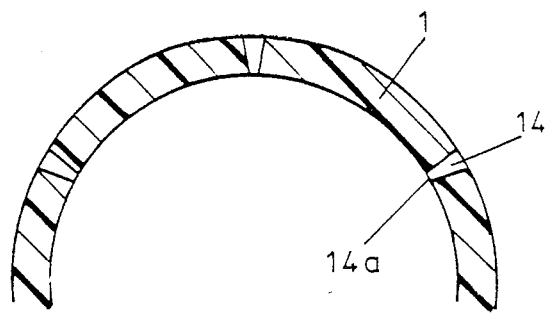
FIGS. 6 through 9 are partial cross-sectional views, on a larger scale, of different types of welding sleeve portions forming part of the adapting piece according to the invention.

The incisions 13 in the welding sleeve portions 1 may be in the form of slots 14. As illustrated in FIGS. 2 and 4, these slots 14 may have parallel sides. Also, as illustrated in FIG. 6, the slots may be shaped so as to conically narrow toward the center. When clamping element 4 clamps welding sleeve portion 1, the gap 14a becomes narrow and finally closes, so that practically a closed inner space is created between the tubular piece 2 and the welding sleeve portion 1.

In accordance with an advantageous feature of the invention, the slots 14 may also be shaped conically in axial direction in such a way that they become conically narrower in longitudinal direction away from the outer end of the sleeve portion.

The length of each slot 14 should reach at least to the middle of the heating element 3a, 3b and should not extend beyond the inner end of the heating element.

Figure 7:
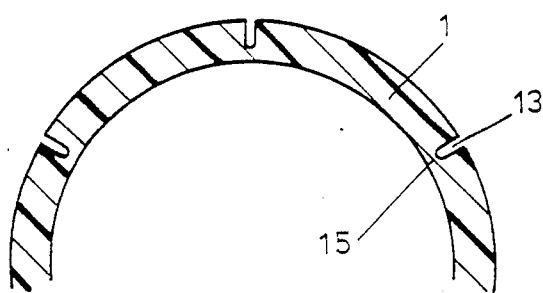
Figure 8:
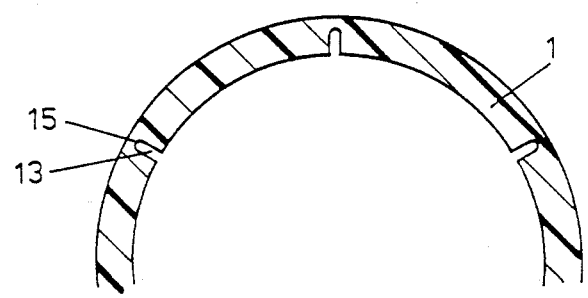
Figure 9:
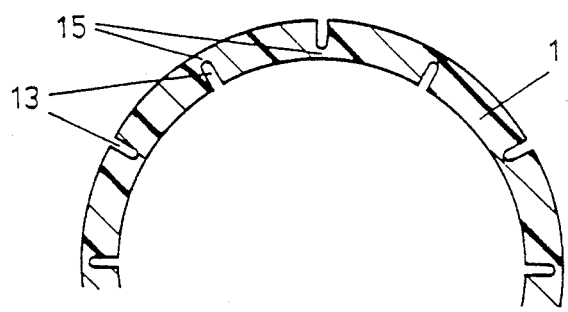

As illustrated in FIGS. 7 and 8, the incisions 13 are made either in the outer circumference or the inner circumference and form a thin web portion 15. A combination of the incisions shown in FIGS. 7 and 8 is illustrated in FIG. 9.

The incisions 13 or slots 14 provided for the purpose of facilitating a simple radial deformation of the welding sleeve portion 1 make it possible in all embodiments of the invention that the inner sleeve contour can be closed to the outside in the clamped condition of the sleeve, so that the interior is limited in size with the interior volume being as small as possible. As a result, an excellent presssure build-up of the melt during the welding procedure is obtained. The sealing toward the outside by the shoulder 8 and toward the inside by the centering seat 5 and the end face 16 further ensure this pressure build-up and a problem-free and secure welded connection.

After the tubular pieces have been inserted in the adapting piece and have been aligned therewith, the tubular pieces 2 are fixed in the welding sleeve portions of the adapting piece by tightening the clamping nut, as illustrated in FIG. 1, or by tightening the clamping ring, as illustrated in FIG. 3, until a change in the position of each tubular piece is not possible either before or during welding. As a result of clamping the clamping element 4, shoulder 8 is creating a slight groove-like deformation of the tubular piece, so that the tubular piece is held axially and is secured against rotation. By radially compressing the welding sleeve portion 1, the radial play existing between the sleeve portion 1, the heating mats and the tubular piece is eliminated and an initial tension is built up in these elements.

Once all adapting pieces to be installed in a certain area are connected to the tubular pieces by clamping, welding can be carried out by connecting the individual heating elements to a current source. Since no heating devices are required, all working steps can be carried out in narrow space conditions. Thus, inserting the tubular pieces into the adapting pieces, fixing and finally securing them together by welding the adapting pieces to the tubular pieces can be carried out in very narrow wall recesses.

The adapting piece may be a T piece, as illustrated in FIGS. 1 and 3. The adapting piece may also be an angle, a bend or a straight connecting sleeve for connecting pipes with equal or unequal diameters.

The thermoplastic material to be used for the adapting pieces must be weldable. For example, polyethylene can be used. In the case of sanitary installations, polybutene is suitable.

FIGS. 10, 11 and 12 show a sleeve portion 1 of an adapting piece or a fitting of a weldable thermoplastic material with an electric heating device 3 for effecting a connection to a tubular piece 2 and with a clamping element 4.

The heating device 3 includes two heating elements 3a, 3b which are located opposite each other in the circumferential direction. The heating conductors 38 of the heating elements 3a, 3b are connected in parallel.

The heating conductor 38 is a bare resistance wire 31 and includes windings which extend in the longitudinal direction of the sleeve portion 1. Two adjacent ends 34a, 34b or 35a, 35b are each connected to a current connector 36, 37, as also illustrated in FIGS. 5, and are rigidly connected to a metal socket sleeve 40. The socket sleeves 40 serve for the connection of the heating device 3 to a current source by means of plugs.

When the adapting piece is manufactured by means of injection molding, the windings of the heating device 3 and the socket sleeves 40 already connected thereto are arranged in a fixed position in the injection mold and the plastics material is injected around the windings and the socket sleeves, so that these components are embedded in the sleeve portion 1 of the adapting piece surrounded by plastics material.

The beginning of the winding is spaced from the front end 24 of the sleeve by a distance A and the windings extend in the sleeve portion over a length B. The windings end in front of the stop surface 6 for the tubular component 2.

Starting at the front end 24, the sleeve portion 1 has radial incisions 13 which are distributed over the circumference and extend in longitudinal direction. Over a length a the incisions are slots 14 which extend to the centering seat 5. The slots 14 end radially in a gap 14a and end axially in front of the beginning of the windings, so that an intermediate wall extends therebetween. In the area of the heating device, the incisions 13 have only such a depth that a wall 25 exists between the slots and the heating device. The incisions 13 have at least a total length L which reaches to the middle of the heating device. In other words, L is greater than or equal to A+B/2. The incisions 13 narrow conically toward the inside. In the region over length l, the incisions are conical towards the outside and parallel toward the inside and, thus, form a parallel gap 14a.

The clamping element 4 preferably is a commercially available clamping ring 26. Clamping ring 26 can be clamped together by means of a screw 27 and is arranged in a reduced diameter portion 19 of the outer circumference of sleeve portion 1. A clamping ring 20 as shown in FIG. 4 can also be used.

After a tubular piece 2 has been inserted in the sleeve portion 1 of the adapting piece, the tubular piece 2 is fixed in the sleeve portion by clamping together the clamping ring 26 or 20. As a result, the position of the tubular piece in the sleeve portion cannot change prior to or during welding.

A tight clamping action is obtained essentially in he forward sleeve portion extending over length a. The tubular piece is held axially and against rotation by frictional engagement.

The gaps 14a have such a width that even in the case of the greatest possible play between the tubular piece and the sleeve portion due to the tolerances of the tubular piece a tight clamping is sill ensured. By narrowing or closing the gap 14a, essentially a closed inner space is created between the tubular portion 2 and the sleeve portion 1, so that the welding pressure necessary for a problem-free welding can build up.

The incisions in the region of the heating device and the fact that the windings of the heating device extend in longitudinal direction ensure a radial deformation of these components in the welding region, so that any play existing between the tubular piece and the inner circumference of the sleeve portion existing prior to welding can be eliminated by radial compression, so that a problem-free welding is guaranteed.

While specific embodiments of the invention have been shown and described in detail to illustrate the application of the inventive principles, it will be understood that the invention may be embodied otherwise without departing from such principles.

We claim:

1. An adapting piece of weldable thermoplastic material, comprising at least one welding sleeve portion with an electric heating device, the welding sleeve portion being adapted for weld-connecting the adapting piece to a tubular piece, the welding sleeve portion having an end face, a longitudinal axis and a circumference, the electric heating device comprising windings extending in longitudinal direction, the electric heating device in circumferential direction forming two winding portions which are connected in parallel, the windings having a middle in longitudinal direction, the welding sleeve portion defining a plurality of radial incisions extending in longitudinal direction, wherein, starting at the end face over a first part in longitudinal direction of the welding sleeve portion, the incisions are slots extending radially through the welding sleeve portion, each slot in the first part in longitudinal direction of the welding sleeve portion defining a gap at the radially inner end of the welding sleeve portion, the gap having surfaces which extend parallel to each other, the incisions extending longitudinally over a second part in longitudinal direction of the welding sleeve portion adjacent the first part to at least the middle of the windings, the windings of the electric heating device being formed by a bare resistance wire embedded in the thermoplastic material of the adapting piece by injection molding the thermoplastic material around the windings when the adapting piece is manufactured, a clamping element mounted on the circumference of the welding sleeve portion, the clamping element being radially compressible after the tubular piece has been inserted and the welding sleeve portion has been aligned, whereby the tubular piece is clampable in an aligned position by clamping prior to welding, and whereby a substantially closed connection between the tubular piece and the welding sleeve portion is effected for building up a welding pressure required for the welded connection.

2. The adapting piece according to claim 1, wherein, in the second part in longitudinal direction of the welding sleeve portion, the incisions are shaped so as to narrow conically in radial direction toward the axis of the welding sleeve portion.

3. The adapting piece according to claim 1, wherein said welding sleeve portion includes a metal socket sleeve and said winding portions have two adjacent ends which are connected to each other and to said metal socket sleeve.

4. The adapting piece according to claim 3, wherein said welding sleeve portion includes two metal socket sleeves which are arranged circumferentially opposite each other at the end face and on the circumference of the welding sleeve portion, the metal socket sleeves being embedded in the thermoplastic material of the welding sleeve portion.

5. The adapting piece according to claim 1, wherein the clamping element is a clamping ring.

6. The adapting piece according to claim 1, wherein each incision in the second part has a bottom, a wall of thermoplastic material being arranged between the bottom of the incisions and the resistance wire.

* * * * *